United States Patent

Panster et al.

[11] Patent Number: 4,647,644
[45] Date of Patent: Mar. 3, 1987

[54] PHENYLENESULFONATE GROUP-CONTAINING ORGANOPOLYSILOXANES, METHOD FOR THEIR PREPARATION AND USE THEREOF

[75] Inventors: Peter Panster, Rodenbach; Peter Kleinschmit, Hanau, both of Fed. Rep. of Germany

[73] Assignee: Degussa Aktiengesellschaft, Frankfurt, Fed. Rep. of Germany

[21] Appl. No.: 865,490

[22] Filed: May 21, 1986

[30] Foreign Application Priority Data

May 25, 1985 [DE] Fed. Rep. of Germany ....... 3518881

[51] Int. Cl.$^4$ .................. C08G 77/22; C07F 7/08; C07F 5/06; C07F 7/28
[52] U.S. Cl. ......................... 528/30; 556/9; 556/10; 556/428; 528/9; 528/25; 528/33; 528/34
[58] Field of Search ............... 556/9, 10, 428; 528/30, 528/25, 9, 33, 34

[56] References Cited

U.S. PATENT DOCUMENTS 4,424,332 1/1984 Panster et al. .................. 528/30
4,455,415 6/1984 Panster et al. .................. 528/30 X Primary Examiner—Paul F. Shaver
Attorney, Agent, or Firm—Beveridge, DeGrandi & Weilacher

[57] ABSTRACT

Phenylenesulfonate group-containing organopolysiloxanes are disclosed consisting of units represented by the formula:

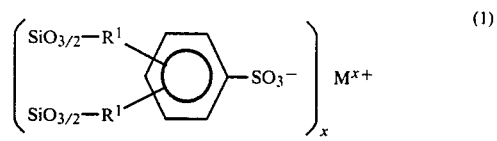

(1)

in which $R^1$ represents $-CH_2-CH_2-$ or $CH_3-CH<$, x is equal to a number from 1 to 4 depending on M, and M represents hydrogen or a 1-4 valent metal ion or $NH_4$, and the free valences of the oxygen atoms are saturated by silicon atoms of further groups of formula (1) and/or by cross-linking agents and/or by nonsulfonated phenylene units represented by the formula:

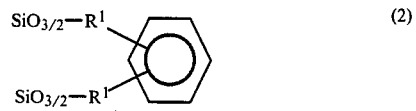

(2)

A method for the preparation of the phenylenesulfonate group containing organopolysiloxanes, as well as the use of said substances as strongly acidic cation exchangers is also disclosed.

20 Claims, No Drawings

PHENYLENESULFONATE GROUP-CONTAINING ORGANOPOLYSILOXANES, METHOD FOR THEIR PREPARATION AND USE THEREOF

The invention relates to new phenylenesulfonate group-containing organopolysiloxanes, which have various advantages in their capacity as strongly acidic cation exchangers over known cation exchangers based on purely organic polymers or on inorganic carrier systems. Further, the invention also pertains to processes for the preparation and use of these new products.

It is known that strongly acidic cation exchangers, whose functional groups consist of sulfonic acid units, are widely employed in chemical synthesis and application technology, e.g. for the separation of chemical compounds, for the isolation and recovery of metal ions from solutions, as solid acid catalysts, as carriers of active substances, for the purification and desalination of water and aqueous solutions or for the treatment of drinking water. The types used almost exclusively to date consist of an organic polystyrene skeleton, cross-linked, if necessary, with diethylenebenzene units, in which the phenylene units are substituted with sulfonate groups. These marketed cation exchangers, however, possess a number of limitations in relation to application technology, which are chiefly attributable to their physical and chemical properties determined by the organic nature of the polymeric skeleton. These include the relatively low temperature resistance of about 100° to 150° C., a somewhat high sensitivity to chemical and bacterial attack, which can result in total matrix break down, solubility in certain solvents under more vigorous conditions, high swelling capacity and dependence of the exchange volume on the type of cation, and a limited need for swelling to make the functional groups accessible, which, in turn, renders them unusable in certain organic solvents.

These disadvantages could be largely avoided with the use of an inorganic matrix, since inorganic polymers such as, for example, silicic acids or silica gel, aluminum oxide, titanium dioxide, zirconium dioxide, etc., have a fixed, rigid structure; only a limited, or essentially no capacity for swelling; high resistance to temperature and aging; are insoluble in organic solvents, water, and acids; and are characterized by ready accessibility to the existing functional groups, because these are generally found on the surface. In view of the above, it is also understandable that strongly acidic ion exchangers based on inorganic materials have been synthesized previously, as is evident from European Patent Application No. 0 008 902 or British Patent No. 1 506 226.

However, in these cases it is a disadvantage that the loading capacity of inorganic materials is merely very low because of the relatively low number of functional groups, since the corresponding strongly acidic cation exchangers have a maximum capacity of only 0.5–0.6 meq $H^+$/g in the $H^+$ form. Because the $SO_3H$-carrying group is anchored to the carrier surface only via a hydrolysis sensitive Si—O—Si unit for steric reasons in terms of a statistical average, there is moreover always the danger of its detachment.

The state of the art in the ion exchange field is described in the form of a review, for example, in Ullmanns Enzklopaedie der technischen Chemie, 4th ed., Vol. 3, p. 279, or in Chem.-Ing.-Tech. 51, 7, 728 (1979).

Recently, German Application (OLS) No. 32 26 093 described new cation exchangers with an organopolysiloxane skeleton beyond this state of the art; these exchangers also have the advantages of the type described above with regard to inorganic carriers, but not their disadvantages, since their capacity is many times higher and the anchoring of the $SO_3$-carrying organic groups occurs via a trivalent Si atom inserted into the matrix and is accordingly more stable. Moreover, the stability of the matrix can be increased by the insertion of so-called cross-linking agents, also in the form of heteroatoms, the $SO_3$—group density as well as specific surface area and porosity can be affected; and the catalytic properties can be altered advantageously if they are used as solid acid catalysts or also in partially or totally metal exchanged form as metal catalyst.

In terms of type, the last mentioned cation exchangers are alkyl- or arylalkylsulfonates. However, corresponding phenylsulfonates, which differ in acid strength and in physical and chemical properties, are, however, not yet known and their provision is therefore the object of the invention being described here.

The phenylenesulfonate group-containing organopolysiloxanes incorporating the invention are particularly characterized by the fact that they contain identical or different units represented by the formula:

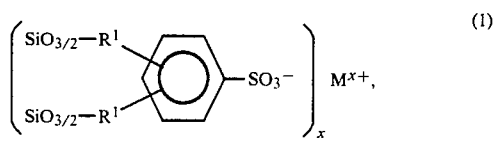

in which the bridge groups $R^1$ represent the groups —$CH_2$—$CH_2$— or $CH_3$—$CH<$ and can be identical or different, x is equal to a number from 1 to 4 depending on M, and M represents hydrogen or a 1–4 valent metal ion or $NH_4$, and the free valences of the oxygen atoms are saturated by silicon atoms of further groups of formula (1) and/or by cross-linking bridge groups:

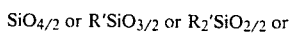

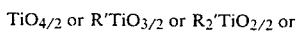

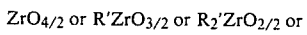

in which R' is a methyl or ethyl group, and/or are saturated by nonsulfonated phenylene units represented by the formula:

in which the bridge groups $R^1$ have the same meaning as in formula (1) and can be identical or different, and the ratio of the sum of the Si atoms in formulas (1) and (2) to the bridge atoms silicon, titanium, zirconium, and aluminum is 0 to 1:15.

The position of the two $SiO_{3/2}$—$R^1$ substituents relative to each other on the phenylene group is of secondary importance; both an ortho- and a meta- or a para- position may exist. This also applies to the position of the sulfonate group in relation to both $SiO_{3/2}R^1$. All possible isomers are also included in this respect.

The ratio of the sulfonate group-carrying units of formula (1) to the Si-, Ti-, Zr-, and Al-containing cross-linking groups that may exist in the polymeric structure and to the phenylene groups of formula (2) has a lower limit because in the presence of the basic H+ form, i.e., if according to formula (1) x = 1 and M = H, a minimum H+ capacity of 0.1 meq/g of organopolysiloxane and a maximum capacity occur if no units of formula (2) and no cross-linking Si-, Ti-, Zr-, and Al-containing bridge groups are present in the solid matter. In principle, this situation can occur in many applications of the phenylene sulfonate group-containing organopolysiloxanes. In view of the physical properties such as, for example, the specific surface area, temperature resistance and resistance of the matrix to partial or total solution in aqueous media, and in view of the rapid accessibility to all the sulfonate groups present, it is desirable that Si-, Ti-, Zr-, or Al-containing cross-linking groups and/or nonsulfonated phenylene units of formula (2) be present in the polymeric structure.

Therefore, from the viewpoint of application technology properties, new phenylenesulfonate group-containing organopolysiloxanes with a capacity of at least 0.1 meq H+/g of organopolysiloxane to a maximum of 3.16 meq H+/g are suitable, and those with a capacity of at least 0.5 meq H+/g to 3.16 meq H+/g of organopolysiloxane are especially preferred.

With respect to the resistance of the new phenylenesulfonate group-containing organopolysiloxanes to partial or total solution at increased temperature in water or polar organic solvents, it is advantageous to subject the product to tempering after its preparation, if necessary in conjunction with drying or just before use, during a 1-hour to 5-day treatment at a temperature of 100° C. to a maximum of 350° C. in air, under a protective atmosphere, at standard pressure, in vacuum, or at gage pressure. The technique of tempering is likewise known, for instance, from the synthesis of silicic acids and silica gels. It causes further dehydration or cleavage of alkoxy groups still present in the polymer substance and/or Si-bound chlorine atoms in the form of the corresponding alcohol and/or of hydrogen chloride gas with concurrent formation of siloxane bonds.

Another object of the invention is a method for the preparation of the new phenylenesulfonate group-containing organopolysiloxanes. According to the most essential process, organopolysiloxanes consisting of units of the formula:

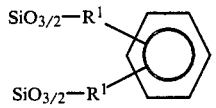 (2)

in which the bridge groups $R^1$ represent the groups —$CH_2$—$CH_2$— or $CH_3$—CH< and can be identical or different, and the free valences of the oxygen atoms are saturated by silicon atoms of other groups of formula (2) and/or by cross-linking bridge groups:

$SiO_{4/2}$ or $R'SiO_{3/2}$ or $R_2'SiO_{2/2}$ or $TiO_{4/2}$ or $R'TiO_{3/2}$ or $R_2'TiO_{2/2}$ or $ZrO_{4/2}$ or $R'ZrO_{3/2}$ or $R_2'ZrO_{2/2}$ or $AlO_{3/2}$ or $R'AlO_{2/2}$ in which R' is a methyl or ethyl group, and the ratio of the sum of the Si atoms in formula (2) to the bridge atoms silicon, titanium, zirconium, and aluminum is 1:0 to 1:15, are reacted with stoichiometric, reduced, or excess amounts of an appropriate sulfonation agent, in the latter case up to 50 times the amount necessary for the single sulfonation of all the phenylene groups present, in liquid phase at temperature of −78° C. to 250° C., preferably −50° C. to 150° C., especially −20° C. to 150° C., over a period of a few minutes to several days, optionally under a pressure corresponding to the sum of the partial pressures of the reaction components at the reaction temperature, whereupon the solid is separated from the liquid phase, extracted, or washed, then optionally dried in air, in vacuum or under a protective atmosphere at temperatures from room temperature to 150° C. and tempered for 1 hour to 5 days, optionally in air, in vacuum or under a protective atmosphere at temperatures varying from 100° C. to 350° C., the extraction or washings and drying being repeated where necessary, and the product being finally ground and/or graded as required, during which one or several of the steps to be performed after the reaction can be omitted or carried out in a different order of sequence.

If the preparation of as finely divided a product as possible is desired, a grinding procedure can be carried out before, during, or after the sulfonation in suspension or also after separation from the liquid phase while still in the wet state.

With respect to the sulfonation rate of the organopolysiloxane of formula (2), there is, as expected, a considerable dependence on the particle fineness so that an accelerated sulfonation can be ascertained for the smaller particle size. Sulfonation agents, with which a sulfonation of the phenylene group can be achieved in the process embodying the invention, are all sulfonation reagents known from organic synthesis such as, for example, concentrated sulfuric acid, solutions of $SO_3$ in concentrated sulfuric acid or also in chlorosulfonic acid. Especially preferred, particularly for technical and economic reasons, are concentrated sulfuric acid or solutions of $SO_3$ in sulfuric acid, in which the polysiloxane of formula (2) can be sulfonated directly, without other agents, while, for example, anhydrous conditions must exist if chlorosulfonic acid is used and the employment of an additional solvent, typically a chlorinated hydrocarbon such as, for example, chloroform, is advisable.

The phenylenesulfonate group-containing organopolysiloxanes are invariably obtained in the H+ form according to the described process for the preparation of the new organopolysiloxanes. All other exchange forms that cannot be obtained directly by sulfonation are accessible according to another preparation process.

This method is characterized by the fact that phenylenesulfonic acid group-containing organopolysiloxanes consisting of units of the formula:

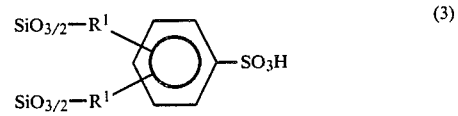 (3)

in which the bridge groups $R^1$ represent the groups —$CH_2$—$CH_2$— or $CH_3$—CH< and can be identical or different, and the free valences of the oxygen atoms are saturated by silicon atoms of further groups of formula (3) and/or by cross-linking bridge groups:

$SiO_{4/2}$ or $R'SiO_{3/2}$ or $R_2'SiO_{2/2}$ or $TiO_{4/2}$ or $R'TiO_{3/2}$ or $R_2'TiO_{2/2}$ or $ZrO_{4/2}$ or $R'ZrO_{3/2}$ or $R_2'ZrO_{2/2}$ or $AlO_{3/2}$ or $R'AlO_{2/2}$ in which R' is a methyl or ethyl group, and/or by phenylene units of the formula:

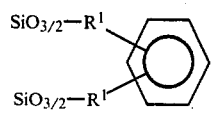
(2)

in which the bridge groups $R^1$ have the same meaning as in formula (3) and can be identical or different, and the ratio of the sum of Si atoms in formulas (3) and (2) to the bridge atoms silicon, titanium, zirconium, and aluminum is 1:0 to 1:15, are reacted with an inorganic or organic reagent, which can dissociate into a cation and anion, in undried, dried, and/or tempered, ground, unground, and/or graded form, for mutual exchange of cations according to the static or dynamic ion exchange principle, then washed, and then, if necessary, the solid is separated from the liquid phase and optionally dried, as well as ground and/or graded and tempered in any order of sequence desired.

This ion exchange process also comprises an ion exchange in the form of a neutralization, for example, upon reaction of the phenylenesulfonic acid-containing organopolysiloxanes with alkali metal or alkaline earth metal hydroxides or with ammonia, as can be performed according to the static or dynamic principle in the case of previously known ion exchange resins. Accordingly, the ion exchange can be carried out in a moving suspension of the phenylenesulfonic acid-containing starting compound with the dissociable reagent which is at least partially dissolved. The insoluble phenylenesulfonic acid-containing material is brought into contact with the dissociable reagent which is at least partially dissolved and with which the exchange should occur, in an aqueous suspension or in an organic suspending medium, preferably of a polar nature. Then, the solid is separated and, if necessary, once again mixed with a fresh solution of the reactant. This process is repeated until the ion exchange has occurred to the extent desired. Thereupon, the solid can be separated according to current techniques, such as filtration, centrifugation and/or decanting, washed until salt-free, and dried at room temperature or increased temperature to 150° C., optionally in air, under a protective atmosphere, or in vacuum, tempered at temperatures of 100° C. to 350° C., ground and graded.

If the dynamic principle is employed, then the phenylenesulfonic acid-group-containing starting compound is used as an exchange bed and brought into contact with the solution of the reactant which is at least partially dissolved. Secondary treatments within the indicated scope can be provided here as well, as for the products obtained by the static methods.

In general, the order of sequence of the treatment steps to be performed after the drying can also be interchanged or some can be omitted.

If an exchange column is used as the exchange bed, then the initial polymeric product must possess a minimum particle size, which is also determined by column dimensions in order to ensure a sufficient flow rate. In general, in the case of laboratory columns one can make do with a minimum particle size of 0.2 mm. The maximum particle size, on the other hand, is limited because a sufficient exchange and/or diffusion rate must still be present within a realistic residence time. When the exchange is completed, here as well the mixture is washed until salt free and either secondary treatments or further exchange treatments can then be carried out. Needless to say that grinding of the exchanged product can be carried out not only in the dry, but also in the wet state.

The most essential application of the new products disclosed, namely employment as universally utilizable cation exchangers that possess a very temperature- and solvent-resistant matrix and can be used in aqueous and organic media, is based on the cation exchange capacity of the novel phenylenesulfonate group-containing organopolysiloxanes. A preferred application of these phenylenesulfonate group-containing polysiloxanes is evidenct in employment as ion exchangers for cations also because of the existing possibility for extensive modification of the matrix in the manner described earlier.

Therefore, the invention has also as its object the use of the new phenylenesulfonate group-containing polysiloxanes as cation exchangers.

The new products can be characterized, for example, by elemental analysis and exchange results. Their decomposition points are higher than 200° C. if prepared in air, and greater than 300° C. if prepared under a protective atmosphere. Depending on the preparatory treatment and the type and amount of cross-linking agent employed, they have specific surfaces ranging from less than 1 m²/g up to 1000 m²/g, and particle diameters of about 1 cm to less than 1 micron. A particle size range from 0.1 to 1.5 mm, as necessary for the technical application as ion exchangers, can be varied without difficulty.

The invention is further described and illustrated by the following examples.

EXAMPLE 1

20 g of a phenylene group-containing organopolysiloxane, comprising up to about 90% of units of the formula:

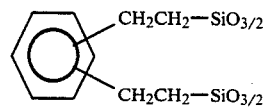

and up to about 10% of units of the formula:

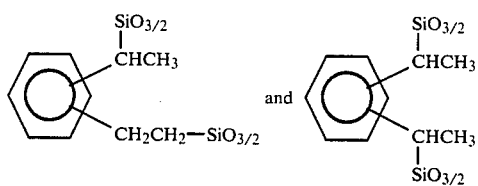

(2:1 distribution of amounts by weight)

with a particle size of 0.2-0.4 mm, was charged to 100 ml of concentrated sulfuric acid with stirring. The suspension was then heated in a 250 ml three neck flask with reflux condenser, KPG stirrer and internal thermometer to 100° C. and stirred for 24 hours at this temperature. The mixture was cooled after this time and the reaction suspension was charged to 500 ml of ice water with stirring. The solid was filtered off, washed with about 500-600 ml desalinated water until neutral, and dried for 24 hours at 120° C./80 mbar. 25.5 g of a product in the form of a brown coarsely grained powder was obtained.

A theoretical sulfur value of 10.13% and a capacity of 3.16 meq $H^+$/g were expected for a total single sulfonation of all the phenylene groups present. Elemental analysis yielded 9.30% S. Direct titration of the sulfonic acid groups present in the solid with 0.1 N NaOH until a pH of 6.0 was achieved gave an $H^+$ capacity of 3.02 meq/g of dry product.

EXAMPLE 2

20 g of the starting material used in Example 1 with a particle size of 0.2-0.4 mm was suspended in 100 ml of dried methylene chloride. To this suspension was added dropwise 8 ml of chlorosulfonic acid, diluted with 30 ml of methylene chloride, at room temperature over a 15-minute period with vigorous stirring. The mixture was stirred for a total of 4 hours at room temperature with initially vigorous HCl evolution. Then the solid was filtered off, washed with a total of 200 ml of methylene chloride, and dried for 6 hours at 100° C. The dried solid was then suspended in 100 ml of water and again filtered after 1 hour, washed once more with 200 ml of $H_2O$, then dried for 12 hours at 120° C./100 mbar, and tempered for 20 hours at 200° C. under an $N_2$ atmosphere. 24.2 g of a sulfonic acid group-containing polysiloxane with an $H^+$ capacity of 2.34 meq/g, determined by direct titration with 0.1 N NaOH, was obtained. The analytically determined sulfur content of the solid was 7.42%.

EXAMPLE 3

25 g of a polymeric product, comprising up to about 90% of units of the formula:

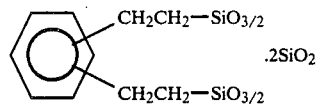

and up to about 10% of units of the formula:

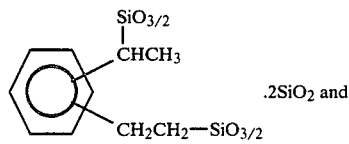

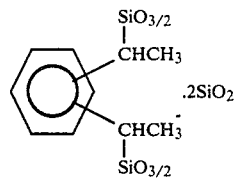

(2:1 distribution of amounts by weight)

with an ortho-/meta/para-isomer ratio of 12% by weight/65% weight/23% by weight and a particle size of 0.3-1.2 mm, was suspended in 120 ml of concentrated sulfuric acid. The mixture was stirred for 15 hours at 100° C., then cooled, and stirred into 500 ml of ice water. The solid was then filtered off, rewashed with 300 ml desalinated water, as well as dried for 8 hours at 120° C., and tempered for 15 hours at 200° C. under an $N_2$ atmosphere. 27.8 g of a sulfonic acid group-containing polysiloxane with a capacity of 2.25 meq $H^+$/g and an S content of 7.18% was obtained. A capacity of 2.29 meq $H^+$/g and an S value of 7.34% were expected for a total single sulfonation of all phenylene groups present.

EXAMPLE 4

11.9 g of a sulfonic acid-group-containing polysiloxane with a capacity of 2.52 meq $H^+$/g and a sulfur content of 7.80% was obtained from 10 g of the starting material used in Example 1 and 40 ml of fuming sulfuric acid with a content of 30% $SO_3$ by weight after 6 hours of stirring at room temperature and after workup as described in Example 1.

EXAMPLE 5

20 g of the phenylene-group-containing organopolysiloxane, consisting of units of the formula:

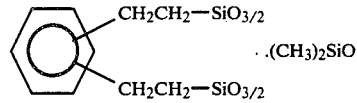

with a meta-/para-isomer ratio of 60% by weight/40% by weight and a particle size of 0.3-1.2 mm, was stirred for 20 hours in 150 ml of concentrated sulfuric acid at a temperature of 100° C. After further workup as described in Example 1, 22.3 g of a sulfonic acid group-containing polysiloxane, cross-linked with $(CH_3)_2SiO$ group, with a capacity of 2.61 meq $H^+$/g and a sulfur content of 8.25% was obtained. A theoretical capacity of 2.56 meq $H^+$/ and a theoretical sulfur content of 8.21% were expected for single sulfonation of all the phenylene groups present.

EXAMPLE 6

17.2 g of a $TiO_2$-crosslinked sulfonic acid-group-containing polysiloxane with a capacity of 1.78 meq $H^+$/g and a sulfur content of 5.91% was obtained from 15 g of a phenylene group containing organopolysiloxane, consisting of units of the formula:

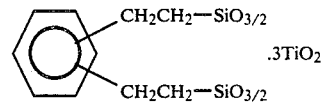

with a meta-/para-isomer ratio of 60% by weight/40% by weight and a particle size of 0.3-1.2 mm, and 80 ml of concentrated sulfuric acid after 24 hours of stirring at 100° C. and workup as described in Example 1.

EXAMPLE 7

21.0 g of an (H₅C₂)AlO-crosslinked sulfonic acid group-containing polysiloxane with a capacity of 1.97 meq H⁺/g and a sulfur content of 7.77% was obtained from 20 g of a phenylene group-containing organopolysiloxane, consisting of units of the formula:

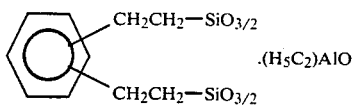

with an ortho-/meta-isomer ratio of 60% by weight/40% by weight and a particle size of 0.2-0.4 mm, and 100 ml of concentrated sulfuric acid after 24 hours of stirring at 100° C. and workup as described in Example 1.

EXAMPLE 8

11.5 g of a ZrO₂-crosslinked sulfonic acid group-containing polysiloxane with a capacity of 2.24 meq H⁺/g and a sulfur content of 7.30% was obtained from 10 g of a phenylene group-containing organopolysiloxane, consisting of units of the formula:

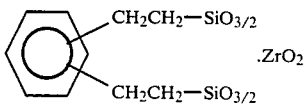

with an ortho-/meta-isomer ratio of 60% by weight/40% by weight and a particle size of 0.2-0.4 mm, and 50 ml of concentrated sulfuric acid after 24 hours of stirring at 100° C. and workup as described in Example 1.

EXAMPLE 9

5 g of the sulfonic acid group-containing organopolysiloxane prepared in Example 1 with a capacity of 3.02 meq H⁺/g and a particle size of 0.2-0.4 mm was stirred for 1 hour in 200 ml of dried 0.1 N NaOH solution. Then the solid was filtered off, and washed with 100 ml of desalinated water. The solid was then combined with 50 ml of 0.5 N HCl solution, stirred for 15 min, and filtered off. This process was repeated 2 more times, whereupon the solid was washed with 100 ml of water until acid free, and dried for 6 hours at 120° C./100 mbar. The three remaining acid solutions and the wash water were combined and the sodium content was determined. Accordingly, a total of 309 mg of Na+ was released in the 3 stage acid treatment, which corresponds to an exchange of 89%. Retitration of the dried solid yielded an H+ capacity of 2.75 meq/g, i.e., about 91% of the original value.

EXAMPLE 10

5 g of the sulfonic acid group-containing organopolysiloxane prepared in Example 2 with a capacity of 2.34 meq H⁺/g and a particle size of 0.2-0.4 mm was added to 50 ml of a CuSO₄ solution with a content of 80 g of CuSO₄/liter. The suspension was stirred for 15 min at room temperature in a beaker, then the solution was decanted, and the solid remaining the beaker was again combined with 50 ml of CuSO₄ solution. The mixture was again stirred for 15 min at 50° C., then filtered off, and the solid was flushed with 100 ml of H₂O, and dried for 8 hours at 120° C./100 mbar. The elemental analysis performed subsequently of the resulting product (5.3 g) yielded a copper content of 6.4%. A Cu content of 6.9% was expected for a total replacement of all the H+ions by copper ion.

EXAMPLE 11

5 g of the sulfonic acid group-containing organopolysiloxane prepared in Example 7 with a capacity of 1.97 meq H⁺/g and a particle size of 0.2-0.4 mm was treated twice with 50 ml of a FeCl₃ solution, with a content of 54 g of the FeCl₃ g/liter, as in Example 10. The elemental analysis of the dried solid (5.1 g) yielded an Fe content of 3.1%. An Fe value of 3.5% was expected for a total replacement of all the H+ ions by iron ions.

EXAMPLE 12

10 g of the cross-linked sulfonic acid group-containing organopolysiloxane prepared in Example 3 with a capacity of 2.25 meq H⁺/g and a particle size of 0.3-1.2 mm was initially stirred into 100 ml of desalinated water. After standing for 24 hours, the solid was transferred to a glass column with a frit bottom and an inside diameter of 10 mm.

Next the column was filled with 300 ml of 0.1 N NaOH solution in 5 batches over a 1-hour period and then eluted with 100 ml of water. The H+/Na+ exchange rate was determined to be 98% by back titration of the remaining NaOH amount.

The ion exchanger now in the Na+ form was then treated with a total of 100 ml of 1 N hydrochloric acid in 5 batches. The sodium content in the collected eluates was determined to be 466 mg, which indicates that at least 90% of original capacity of the ion exchanger was again in the H+ form.

Further variations and modifications of the foregoing will be apparent to those skilled in the art and are intended to be encompassed by the claims appended hereto.

The disclosure of German No. 35 18 881.2 is relied on and incorporated herein by reference.

We claim:

1. A phenylenesulfonate group-containing organopolysiloxane comprising identical or different units represented by the formula:

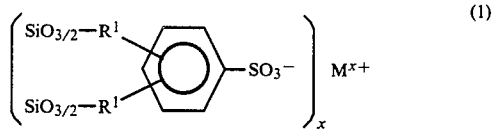

in which the bridge group $R^1$ represents —CH₂—CH₂— or CH₃—Ch< and can be identical or different, x is equal to a ' number from 1 to 4 depending on M, and M represents hydrogen or a 1 to 4 valent metal ion or NH₄, and the free valences of the oxygen atoms are saturated by silicon atoms of other groups of formula (1) and/or by cross-linking bridge groups:

SiO$_{4/2}$ or R'SiO$_{3/2}$ or R$_2$'SiO$_{2/2}$ or

TiO$_{4/2}$ or R'TiO$_{3/2}$ or R$_2$'TiO$_{2/2}$ or

ZrO$_{4/2}$ or R'ZrO$_{3/2}$ or R$_2$'ZrO$_{2/2}$ or

AlO$_{3/2}$ or R'AlO$_{2/2}$ in which R' is a methyl or ethyl group, and/or are saturated by nonsulfonated phenylene units represented by the formula:

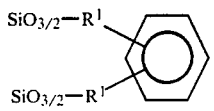 (2)

in which the bridge group R¹ have the same meaning as in formula (1) and can be identical or different, and the ratio of the sum of the Si atoms in formulas (1) and (2) to the bridge atoms silicon, titanium, zirconium, and aluminum is from 1:0 to 1:15.

2. The organopolysiloxane as set forth in claim 1, wherein, if $M^{x+}=H^+$, an $H^+$ capacity exists of at least 0.1 meq/g of organopolysiloxane to at most 3.16 meq/g of organopolysiloxane.

3. A organopolysiloxane as set forth in claim 1 which has been subjected to tempering for 1 hour to 5 days at temperatures of from 100° C. to 350° C., in air or under a protective atmosphere at standard pressure, in vacuum, or at gage pressure.

4. A organopolysiloxane as set forth in claim 2 which has been subjected to tempering for 1 hour to 5 days at temperatures of from 100° C. to 350° C., in air or under a protective atmosphere at standard pressure, in vacuum, or at gage pressure.

5. A process for the preparation of phenylenesulfonate group-containing organopolysiloxanes as set forth in claim 1 wherein organopolysiloxanes, comprising units represented by the formula:

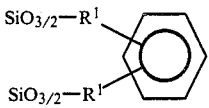 (2)

in which the bridge groups R¹ represent —CH₂—CH₂— or CH₃—CH< and can be identical or different, and the free valences of the oxygen atoms are saturated by silicon atoms of other groups of formula (2) and/or by the cross-linking bridge groups:

SiO₄/₂ or R'SiO₃/₂ or R₂'SiO₂/₂ or

TiO₄/₂ or R'TiO₃/₂ or R₂'TiO₂/₂ or

ZrO₄/₂ or R'ZrO₃/₂ or R₂'ZrO₂/₂ or

AlO₃/₂ or R'AlO₂/₂ in which R' is a methyl or ethyl group, and the ratio of the sum of the Si atoms in formula (2) to the bridge atoms silicon, titanium, zirconium, and aluminum is 1:0 to 1:15, are reacted with stoichiometric, reduced, or excess amounts of a sulfonation agent, up to 50 times the amount necessary for the single sulfonation of all phenylene groups present, in liquid phase at temperatures of −78° C. to 250° C.

6. The process as set forth in claim 5 wherein the temperature of reaction is −50° C. to 150° C.

7. The process as set forth in claim 5 wherein the temperature of reaction is −20° C. to 150° C.

8. The process as set forth in claim 5 wherein the duration of the reaction is a few minutes to several days.

9. The process as set forth in claim 5 wherein the reaction is carried out under a pressure corresponding to the sum of the partial pressures of the reaction components at the reaction temperature.

10. The process as set forth in claim 5 wherein the solid is separated from the liquid phase.

11. The process as set forth in claim 5 wherein the solid is separated and is extracted or washed.

12. The process as set forth in claim 5 wherein the product is dried in air, in vacuum, or under a protective atmosphere at temperatures from room temperature to 150° C. and tempered for 1 hour to 5 days, if necessary in air, in vacuum or under a protective atmosphere at temperatures of 100° C. to 350° C.

13. The process as set forth in claim 5 wherein multiple extractions and/or washings are carried out.

14. The process as set forth in claim 5 wherein the product is subjected to grinding.

15. The process as set forth in claim 5, wherein the sulfonation of the organopolysiloxanes comprising units of formula (2) is carried out with concentrated sulfuric acid, solutions of SO₃ in concentrated sulfuric acid or with chlorosulfonic acid.

16. The process for the preparation of phenylenesulfonate group-containing organopolysiloxanes as set forth in claim 1 wherein the phenylenesulfonic acid-containing organopolysiloxanes, comprising units represented by the formula:

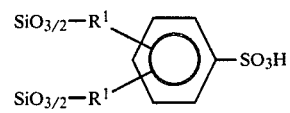 (3)

in which the bridge groups R¹ represent —CH₂—CH₂— or CH₃—CH< and can be identical or different, and the free valences of the oxygen atoms are saturated by silicon atoms of other groups of formula (3) and/or by crosslinking bridge groups:

SiO₄/₂ or R'SiO₃/₂ or R₂'SiO₂/₂ or

TiO₄/₂ or R'TiO₃/₂ or R₂'TiO₂/₂ or

ZrO₄/₂ or R'ZrO₃/₂ or R₂'ZrO₂/₂ or

AlO₃/₂ or R'AlO₂/₂ in which R' is a methyl or ethyl group and/or are saturated by phenylene units represented by the formula:

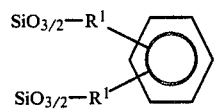 (2)

in which the bridge groups R¹ have the same meaning as in formula (3) and can be identical or different, and the ratio of the sum of the Si atoms in formulas (3) and (2) to the bridge atoms silicon, titanium, zirconium, and aluminum are 1:0 to 1:15, are reacted with an inorganic or organic reagent, which can dissociate into a cation and anion, for mutual exchange of the cations according to the static or dynamic ion exchange principle, then washed, and thereupon, the solid is recovered.

17. The process as set forth in claim 16 wherein the solid is dried.

18. The process as set forth in claim 16 wherein the solid is ground.

19. The process as set forth in claim 16 wherein the ion exchange is carried out in a moving suspension of the parent compound with the dissociable reagent, which is at least partially dissolved, or the parent compound as exchange bed, is brought into contact with the solution of the reagent, which is at least partially dissolved.

20. A strongly acidic cation exchanger which is a shaped body comprising a phenylenesulfonate group-containing organopolysiloxane as defined in claim 1.

* * * * *